US008149239B2

(12) United States Patent  
Satoh (10) Patent No.: US 8,149,239 B2  
(45) Date of Patent: Apr. 3, 2012

(54) IMAGE PROCESSING APPARATUS, IMAGE PROCESSING METHOD, AND STORAGE MEDIUM STORING A PROGRAM FOR CAUSING AN IMAGE PROCESSING APPARATUS TO EXECUTE AN IMAGE PROCESSING METHOD

(75) Inventor: Naoyuki Satoh, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 569 days.

(21) Appl. No.: 12/358,421

(22) Filed: Jan. 23, 2009

(65) Prior Publication Data

US 2009/0189899 A1 Jul. 30, 2009

(30) Foreign Application Priority Data

Jan. 28, 2008 (JP) ................................ 2008-016811

(51) Int. Cl.
- *G06T 15/10* (2011.01)
- *G06T 15/00* (2011.01)
- *G06T 17/00* (2006.01)
- *G06F 17/00* (2006.01)
- *G06F 19/00* (2011.01)
- *G06Q 10/00* (2006.01)
- *A01K 5/02* (2006.01)

(52) U.S. Cl. ........ 345/427; 345/418; 345/419; 345/420; 700/95; 700/96; 700/97; 700/98; 705/28; 705/29; 715/243; 715/244; 715/245; 715/246; 715/247; 715/248; 715/249; 715/250; 715/253

(58) Field of Classification Search .......... 345/418–420; 700/95–98; 705/28, 29; 715/243–253

See application file for complete search history.

(56) References Cited

U.S. PATENT DOCUMENTS

| 5,216,612 | A  | * | 6/1993 | Cornett et al. ................... 700/96 |
| 2003/0210241 | A1 | * | 11/2003 | Minami et al. ................. 345/418 |
| 2007/0008621 | A1 |  | 1/2007 | Satoh et al. |
| 2007/0100713 | A1 | * | 5/2007 | Del Favero et al. ............. 705/29 |
| 2007/0198367 | A1 |  | 8/2007 | Yamagata et al. |
| 2007/0288504 | A1 |  | 12/2007 | Kagawa et al. |
| 2007/0291026 | A1 |  | 12/2007 | Kagawa et al. |
| 2008/0062170 | A1 |  | 3/2008 | Satoh et al. |
| 2008/0086324 | A1 |  | 4/2008 | Yamagata et al. |
| 2010/0107077 | A1 | * | 4/2010 | Hanawa et al. ................ 715/716 |

FOREIGN PATENT DOCUMENTS

| JP | 2003-76724 | 3/2003 |
| JP | 2004-246762 | 9/2004 |
| JP | 2007-219907 | 8/2007 |
| JP | 2007-293437 | 11/2007 |
| JP | 2007-305044 | 11/2007 |

* cited by examiner

*Primary Examiner* — Xiao M. Wu  
*Assistant Examiner* — Andrew Shin  
(74) *Attorney, Agent, or Firm* — Dickstein Shapiro LLP

(57) ABSTRACT

In an image processing apparatus, when an output image generator generates an output image in which an individual image of each part of a product model is arranged around a parts assembly image of the entire product model with a specific part highlighted, a boundary information calculator calculates boundary information for each part highlighted. An individual image arrangement calculator obtains a center position of the highlighted part on the parts assembly image based on the boundary information, obtains a straight line dividing the parts assembly image to equally distribute the parts into respective areas, and calculates a position of arrangement of the individual image of each part corresponding to the highlighted part distributed in each of the areas. The output image generated by the output image generator includes a leading line extending from the individual image of each part to the corresponding part on the parts assembly image.

9 Claims, 7 Drawing Sheets

IMAGE PROCESSING APPARATUS, IMAGE PROCESSING METHOD, AND STORAGE MEDIUM STORING A PROGRAM FOR CAUSING AN IMAGE PROCESSING APPARATUS TO EXECUTE AN IMAGE PROCESSING METHOD

CROSS-REFERENCE TO RELATED APPLICATION

The present application is based on and claims priority from Japanese Patent Application No. 2008-016811, filed on Jan. 28, 2008 in the Japan Patent Office, the entire contents of which are hereby incorporated herein by reference.

BACKGROUND OF THE INVENTION

1. Field of the Invention

Exemplary aspects of the present invention relate to an image processing apparatus, an image processing method, and a storage medium storing a program for causing an image processing apparatus to execute an image processing method.

More particularly, the present invention relates to an image processing apparatus, an image processing method, and a storage medium storing a program for causing an image processing apparatus to execute an image processing method for efficiently generating a two dimensional output image used for a parts catalog or the like based on three-dimensional model data.

2. Description of the Related Art

Generally, service manuals and parts catalogs for industrial products, including mechanical and electronic products, provide a user with information useful for maintenance and operation of the products through such media as electronic data and paper.

Typically, such service manuals and parts catalogs use graphics for showing a structure of the product. When the product is composed of multiple parts, an exploded diagram is used for precisely showing the user how a plurality of components is assembled into the product. The exploded diagram shows the components of the product slightly separated from each other, so that a user can easily grasp a shape of each part and an assembly relation between the components.

Conventionally, experienced illustrators have drawn an illustration of each part by taking the product apart by hand. However, such manual work involves a great deal of time, resulting in high cost.

In order to address this problem, use of 3D (three-dimensional) model data in CAD (computer-aided design) and CG (computer graphics) has spread rapidly. Such 3D model data created by CAD and CG is used for creating a stereoscopic image of a product model.

One known related-art image processing apparatus provides a system for creating an exploded view of a product model based on 3D model data. However, an operator needs to manually specify a direction of each part and a distance between adjacent parts, and position and arrange each part on the created image. In particular, when the assembly is large and includes a lot of components, the amount of work involved in creating such an exploded view increases substantially.

Another known related-art image processing apparatus provides a method of creating a two-dimensional image based on 3D model data without manual input. The created image includes a parts assembly image of a whole product model with a particular part highlighted and a corresponding individual image of the highlighted part. However, since the product model includes multiple parts, a lot of print sheets are needed to print all the output images of each of the plurality of parts, which increases printing costs and is difficult to use.

Therefore, there is a need for a technology to improve viewability of an output image of a product model used for a parts catalog and the like, so that a user can easily grasp relative positions among components of the product model.

BRIEF SUMMARY OF THE INVENTION

This specification describes an image processing apparatus according to illustrative embodiments of the present invention. In one illustrative embodiment of the present invention, an image processing apparatus includes an individual image generator, an assembly image generator, a boundary information calculator, an individual image arrangement calculator, and an output image generator. The individual image generator generates an individual image of each part of a product model based on three-dimensional data. The assembly image generator generates a parts assembly image of the entire product model with a specific part highlighted. The boundary information calculator calculates boundary information for each part highlighted on the assembly image. The individual image arrangement calculator obtains a center position of the highlighted part on the parts assembly image based on the boundary information, obtains a straight line dividing the parts assembly image to equally distribute the parts into respective areas defined by the straight line, and calculates a position of arrangement of the individual image of each part corresponding to the highlighted part distributed in each of the areas. The output image generator generates an output image in which the individual image of each part is arranged around the parts assembly image and a leading line extends from the individual image of each part to the corresponding part on the parts assembly image.

This specification further describes an image processing method according to illustrative embodiments of the present invention. In one illustrative embodiment of the present invention, the image processing method includes generating an individual image of each part of a product model based on three-dimensional data, generating a parts assembly image of the entire product model with a specific part highlighted, calculating boundary information for each part highlighted on the parts assembly image, obtaining a center position of the highlighted part on the assembly image based on the boundary information, obtaining a straight line dividing the parts assembly image to equally distribute the parts into respective areas defined by the straight line, calculating a position of arrangement of the individual image of each part corresponding to the highlighted part distributed in each of the areas, and generating an output image in which the individual image of each part is arranged around the parts assembly image and a leading line extends from the individual image of each part to the corresponding part on the parts assembly image.

This specification further describes a computer-readable storage medium according having recorded thereon computer-readable program code for causing a computer system to execute an image processing method when the program code is executed on the computer system. The image processing method includes generating an individual image of each part of a product model based on three-dimensional data, generating a parts assembly image of the entire product model with a specific part highlighted, calculating boundary information for each part highlighted on the parts assembly image, obtaining a center position of the highlighted part on the assembly image based on the boundary information, obtaining a straight line dividing the parts assembly image to equally distribute the parts into respective areas defined by the straight line, calculating a position of arrangement of the individual image of each part corresponding to the highlighted part distributed in each of the areas, and generating an output image in which the individual image of each part is arranged around the parts assembly image and a leading line extends from the individual image of each part to the corresponding part on the parts assembly image.

BRIEF DESCRIPTION OF THE DRAWINGS

A more complete appreciation of the invention and the many attendant advantages thereof will be more readily obtained as the same becomes better understood by reference to the following detailed description when considered in connection with the accompanying drawings, wherein.

DETAILED DESCRIPTION OF THE INVENTION

In describing illustrative embodiments illustrated in the drawings, specific terminology is employed for the sake of clarity. However, the disclosure of this specification is not intended to be limited to the specific terminology so selected, and it is to be understood that each specific element includes all technical equivalents that operate in a similar manner and achieve a similar result.

Figure 1:
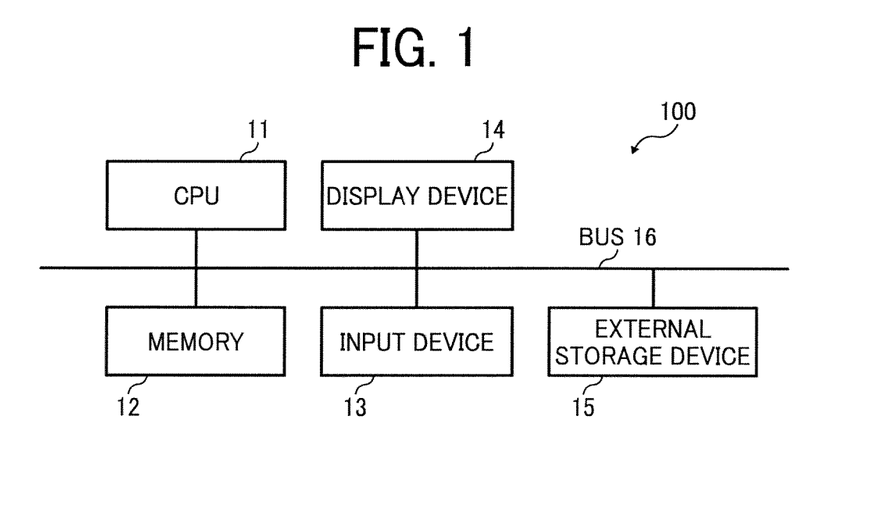
FIG. 1 is a schematic diagram of a hardware configuration of an image processing apparatus according to an illustrative embodiment of the present invention.

Referring now to the drawings, wherein like reference numerals designate identical or corresponding parts throughout the several views, in particular to FIG. 1, an image processing apparatus 100 according to an illustrative embodiment of the present invention is described.

According to the illustrative embodiment, the image processing apparatus 100 generates and outputs a two-dimensional image used for an instruction manual or a parts catalog based on 3D (three-dimensional) models formed by combinations of parts.

The output image includes an assembly image of a whole product assembled with all parts, with a particular part highlighted and an individual image of the highlighted part positioned around the assembly image. It is to be noted that a 3D model, which is also called a geometric model, refers to a data object with a 3D shape and includes 3D CAD (computer aided design) data or data of an actual object obtained by 3D measurement.

According to the illustrative embodiment, the image processing apparatus 100 serves as a system (e.g., a parts catalog printed image creation system) for creating image data used for printing a parts catalog and outputting a printed image generated based on the image data. As well as print output, the image processing apparatus 100 may output the two-dimensional image on a screen of a display device or the like.

FIG. 1 is a schematic diagram of a hardware configuration of the image processing apparatus 100. The image processing apparatus 100 serves as a data processor (system) for constructing the parts catalog printed image creation system, and may be implemented as a general-purpose PC (personal computer) or a PC to which peripheral equipment is connected.

The image processing apparatus 100 includes a CPU (central processing unit) 11, a memory 12, an input device 13, a display device 14, an external storage device 15, and a bus 16 that connects these units.

The CPU 11 serves as a controller for performing data processing of the image processing apparatus 100 and uses various application programs, work data, file data, and the like, stored in the memory 12 and the external storage device 15, to implement a data processing function of each application. When the CPU 11 installs an application program, described later, for generating a printed image of a parts catalog, the image processing apparatus 100, serving as the parts catalog printed image creation system, is provided with an individual image generator, an assembly image generator, a boundary information calculator, an individual image arrangement calculator, and a print data generator, described later, thus transforming the general-purpose PC into a special purpose PC.

According to this illustrative embodiment, the input device 13 includes a keyboard and a mouse, and functions as a GUI (graphical user interface) together with the display device 14, so that a user inputs a search keyword and the like using the keyboard, orders a search for a target part, and specifies the target part using the mouse. In generation of a printed image of a parts catalog, for example, when the display device 14 displays a retrieval image, a user selects a target part from among a plurality of parts on the retrieval image and presses a start key to request generation of the printed image of the selected part. When the product model includes a plurality of units, the display device 14 may display the plurality of units to cause the user to select a target part.

The CPU 11 accepts the request for generation of the printed image as a request signal via the bus 16 and reads corresponding 3D model data from the external storage device 15 and the memory 12. Thereafter, the CPU 11 generates a composite printed image of the parts catalog in which an individual image of each part and an assembly image of the product model are arranged in a predetermined position. The arrangement of respective images on the printed image is described later.

As well as generating the printed image of the parts catalog, the CPU 11 orders the external storage device 15 and the memory 12 to store the generated printed image of the parts catalog as print data, and orders a printer, described later, to output the printed image based on the print data.

A series of processes for storing the print data and outputting the printed image of the parts catalog is performed based on a user's request issued from the input device 13 and the display device 14, serving as a GUI.

The external storage device 15 uses an external HDD (hard disk drive), a CD (compact disk), a ROM (read only memory)

drive, a DVD (digital versatile disk) drive, a MO (magneto-optic), and the like. The memory 12 includes a ROM (read only memory), a RAM (random access memory), an internal HDD, and the like. The external storage device 15 and the memory 12, serving as a recording medium, store the program for generating a printed image of a parts catalog.

Figure 2:
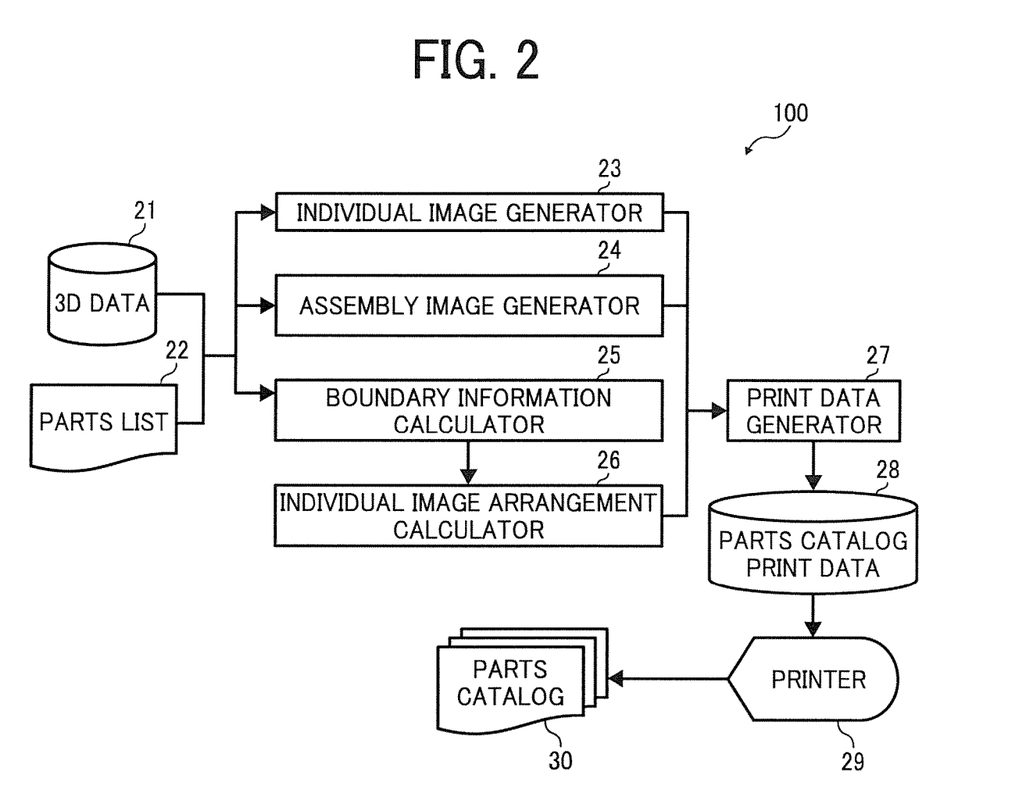
FIG. 2 is a schematic diagram of a software configuration of the image processing apparatus shown in FIG. 1.

Referring to FIG. 2, a description is now given of a software configuration of the image processing apparatus 100, serving as the parts catalog printed image creation system. FIG. 2 is a schematic diagram of a software configuration of the image processing apparatus 100.

The image processing apparatus 100 includes a 3D data 21, a parts list 22, an individual image generator 23, an assembly image generator 24, a boundary information calculator 25, an individual image arrangement calculator 26, a print data generator 27, parts catalog print data 28, a printer 29, and a parts catalog 30.

The parts catalog printed image creation system generates the parts catalog print data 28 from the 3D data 21 and the parts list 22 and outputs an image of the parts catalog generated based on the parts catalog print data 28 from the printer 29.

More specifically, the 3D data 21, the parts list 22, the individual image generator 23, the assembly image generator 24, the boundary information calculator 25, the individual image arrangement calculator 26, and the print data generator 27 generate the parts catalog print data 28. The parts catalog print data 28 generated by the print data generator 27 and the printer 29 are used to output a printed image of the parts catalog. It is to be noted that each of the 3D data 21, the parts list 22, and the parts catalog print data 28 is stored in the memory 12 and the external storage device 15, depicted in FIG. 1, under control of the CPU 11.

A description is now given of a configuration for and an operation of generating the parts catalog print data.

The 3D data 21 and the parts list 22 are stored and managed as data used for generating the parts catalog print data 28. According to this illustrative embodiment, the 3D data 21 is 3D CAD (computer aided design) data. The 3D CAD data includes data of a shape, height, width, depth, and the like, and a whole configuration of the product model assembled with parts. The parts list 22 includes data of each part including information of a name, number, material, and the like of each part, and manages the data of each part separately. The information of a name of a part and a number of the part is used as identification information of the part.

In response to a user's request for generating the parts catalog, the individual image generator 23 reads the 3D data 21 and the parts list 22 from a storage device, for example, the memory 12 or the external storage device 15, depicted in FIG. 1, based on a request for generating a parts catalog, and generates an individual image of each part from the 3D data 21 based on the parts list 22.

To be specific, the individual image generator 23 specifies a requested part based on the information of a name of a part and the like acquired from the parts list 22, and analyzes the 3D data 21 to retrieve data of a height, width, depth, and the like of each part. Based on the data, the individual image generator 23 generates an individual image of each part. Two-dimensional image data is created based on three-dimensional model data using known technology.

It is to be noted that associating the individual image of each part generated by the individual image generator 23 with the identification information of a name of the part and the like is useful for generation of the parts catalog print data 28.

In response to a user's request for generating the parts catalog, the assembly image generator 24 reads the 3D data 21 and the parts list 22 from a storage device, for example, the memory 12 or the external storage device 15, depicted in FIG. 1, and generates a parts assembly image, also referred to as an assembly image, representing a whole construction of a product model assembled with all parts based on the read data. The assembly image generator 24 highlights a part specified by the user based on the information of a name of the part and the like stored in the parts list 22, so that the requested part is displayed in a way that stands out on the assembly image of the product model.

In order to highlight the part on which the user is focusing, the part specified by the user is shown in a different way from which the other parts are shown using known technology. For example, the part specified by the user is realistically drawn using shading, while the other parts are semitransparent. Alternatively, the specified part may be drawn in a striking color. When a display device, for example, the display device 14 depicted in FIG. 1, displays the assembly image, the specified part may be made to flash on and off, or the like.

In response to the request for generating the parts catalog, the boundary information calculator 25 reads the 3D data and the parts list 22 from a storage device, for example, the memory 12 or the external storage device 15, depicted in FIG. 1, and acquires boundary information of each part from the 3D data 21 based on the parts list 22. The boundary information includes position coordinates of the highlighted part on the assembly image generated by the assembly image generator 24.

The individual image arrangement calculator 26 acquires data for defining a position of arrangement of the individual image of each part around the assembly image. The data acquired by the individual image arrangement calculator 26 satisfies a condition that leading lines drawn from a highlighted part on the assembly image to a corresponding individual image do not intersect. Therefore, the calculation performed by individual image arrangement calculator 26 defines a position of arrangement of the individual image based on the boundary information of the highlighted part on the assembly image acquired by the boundary information calculator 25. A specific example of a process for calculating the position of arrangement is described later in detail with reference to FIG. 3B.

The print data generator 27, serving as an output image generator, generates print data for outputting the parts catalog as printed matter. According to this illustrative embodiment, the parts catalog includes an assembly image of a product model with a specific part highlighted and an individual image of the highlighted part positioned around the assembly image. Therefore, the print data generator 27 generates the print data of the parts catalog in which an individual image generated by the individual image generator 23 is arranged around the assembly image generated by the assembly image generator 24 based on the information of position of arrangement acquired by the individual image arrangement calculator 26. Then, the print data generator 27 performs a process for drawing a leading line from the individual image arranged around the assembly image to the corresponding highlighted image on the assembly image, and outputs the generated print data as the parts catalog print data 28 to a storage device, for example, the memory 12 or the external storage device 15, depicted in FIG. 1.

As illustrated in FIG. 2, the image processing apparatus 100, serving as a parts catalog printed image creation system, is connected to the printer 29. The printer 29 performs print output using the parts catalog print data 28 generated by the print data generator 27. The CPU 11 controls the printer 29 in response to a user's request for print output issued from a GUI function, that is, the input device 13 and the display device 14, depicted in FIG. 1. Upon receipt of the request for print output, the printer 29 receives the parts catalog print data 28, drives a plotter based on the parts catalog print data 28, and generates the parts catalog 30 as printed matter.

Figure 3A:
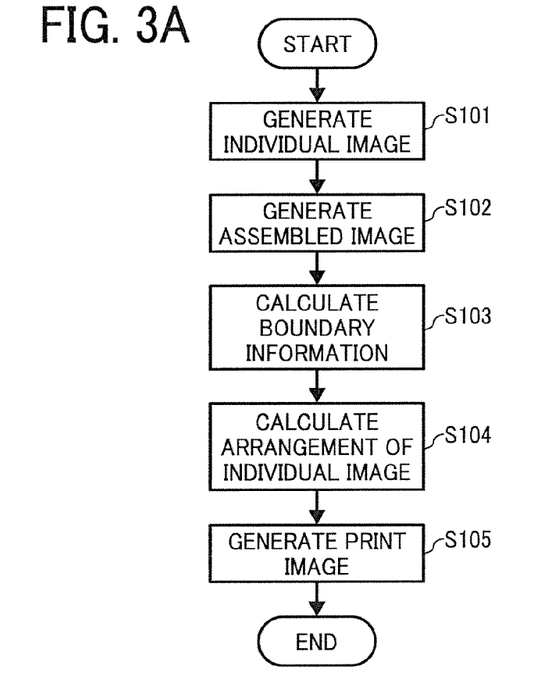
FIG. 3A is a flowchart illustrating a parts catalog printed image generation process performed by the image processing apparatus shown in FIG. 2.
Figure 3B:
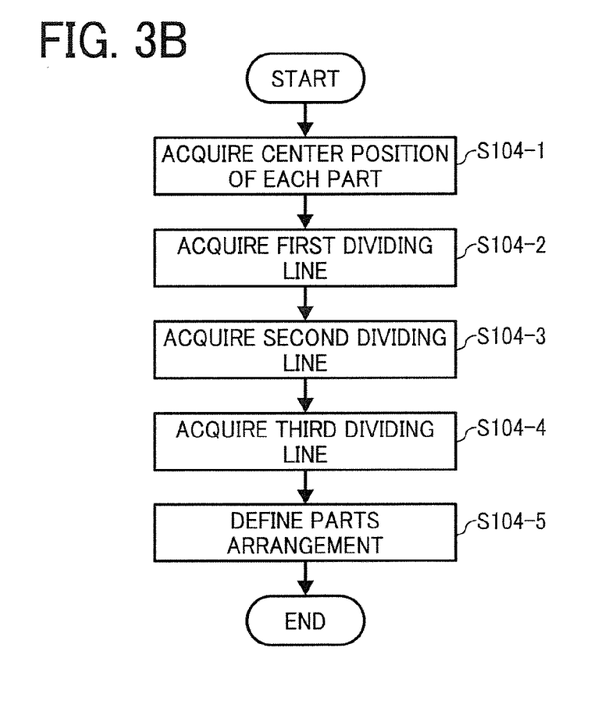
FIG. 3B is a flowchart illustrating a calculation process performed by an individual image arrangement calculator included in the image processing apparatus shown in FIG. 2.
Figure 4:
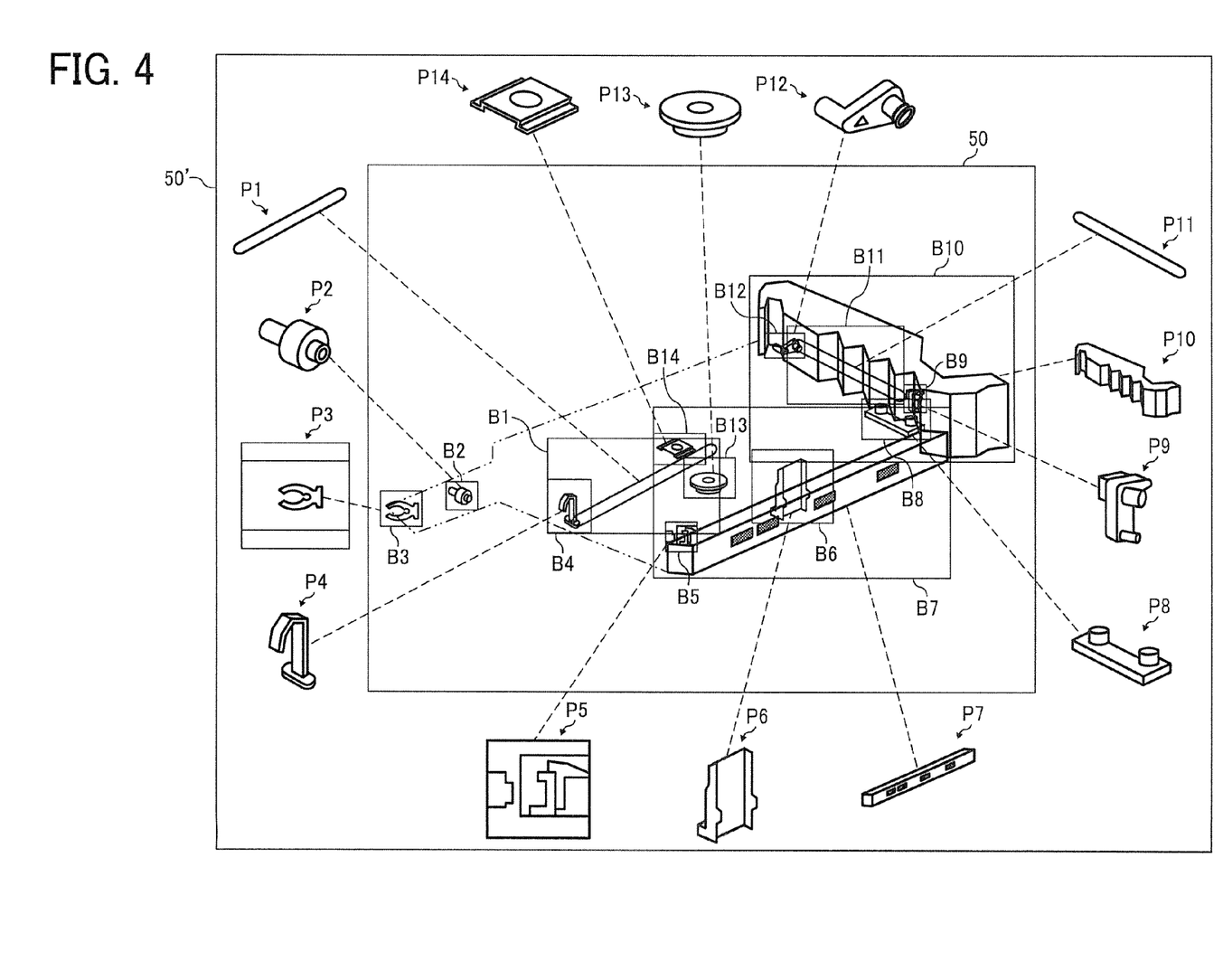
FIG. 4 is an illustration of a printed image of a parts catalog generated by the image processing apparatus shown in FIG. 2.

Referring to FIGS. 3A, 3B, 4, 5, 6, 7, and 8, a description is now given of processes performed by the image processing apparatus 100, serving as a parts catalog printed image creation system. FIG. 3A is a flowchart of processes of generating a printed image of a parts catalog. FIG. 4 illustrates a printed image of a parts catalog generated by the image processing apparatus 100.

The following processes are performed, for example, when a user issues a request for generating a printed image of a parts catalog of a product model assembled with a plurality of parts stored in the 3D data 21 and the parts list 22 depicted in FIG. 1.

When the CPU 11 depicted in FIG. 1 executes a program for generating a printed image of a parts catalog, the individual image generator 23 acquires data of each part of the product model listed on the parts list 22 from the 3D data 21 and generates an individual image of each part based on the acquired data in step S101. It is to be noted that when picture image data and the like other than 3D data is supplied as an individual image, the picture image may be used. Such image data other than 3D data may be supplied by a known method.

The individual image of each part generated in step S101 corresponds to each of images P1 to P14 positioned outside a screen 50 depicted in FIG. 4.

In step S102, the assembly image generator 24 generates a parts assembly image representing a whole image of the product model assembled with all parts constituting the product model. During this process, the assembly image generator 24 highlights a part specified by the user based on the identification information of a name of the part and the like acquired from the parts list 22, so that the specified part is displayed in a way that stands out on the parts assembly image of the product model.

The parts assembly image generated by the assembly image generator 24 in step S102 is displayed on the screen 50 as illustrated in FIG. 4. Parts surrounded by rectangular frames B1 to B14 and indicated by a solid line are to be highlighted, while another parts indicated by a broken line are not highlighted.

It is to be noted that when the whole product model consists of a plurality of units, the assembly image generator 24 may generate a parts assembly image of each unit.

In step S103, the boundary information calculator 25 calculates boundary information of each part highlighted on the parts assembly image generated in step S102.

This calculation is performed for obtaining a position of each part highlighted on the assembly image. The position of each part highlighted is represented by positional coordinates of a center of the part.

To be specific, although the boundary information calculator 25 may obtain coordinates of an outline of each part as boundary information of the part, according to this illustrative embodiment, the boundary information calculator 25 calculates coordinates of a rectangle surrounding the outline of the part, since the calculation of the rectangle easily derives a center position of the part with a small amount of data. Accordingly, the boundary information of each part is represented by coordinates of two points, (Xmax, Ymax) and (Xmin, Ymin), in an x- and y- (two-dimensional) coordinate system mapped onto the parts assembly image. Each side of the rectangle representing the boundary information of each part is parallel to one of the axes of the x and y coordinates.

The rectangular frames B1 to B14 on the assembly image displayed on the screen 50 in FIG. 4 correspond to the rectangle calculated by the boundary information calculator 25 as boundary information of each part highlighted on the parts assembly image in step S103, and surround the outline of each part highlighted and indicated by the solid line, respectively.

In step S104, the individual image arrangement calculator 26 calculates a position of arrangement of the individual image of each part based on the boundary information of the part highlighted calculated by the boundary information calculator 25 in step S103. This calculation is used for generating a printed image of a parts catalog showing a parts assembly image of a product model with a particular part highlighted surrounded by an individual image of each highlighted part generated by the individual image generator 23 in step S101. It is to be noted that the individual image of each part is arranged around the parts assembly image, such that leading lines drawn from each of the highlighted parts on the parts assembly image to the corresponding individual image do not intersect.

According to this illustrative embodiment, the individual image arrangement calculator 26 obtains one or more straight lines dividing the assembly image to equally distribute the center positions of each part calculated based on the boundary information of the highlighted part on the assembly image, so that the individual image of each part is positioned in a corresponding area defined by the straight lines.

Figure 5:
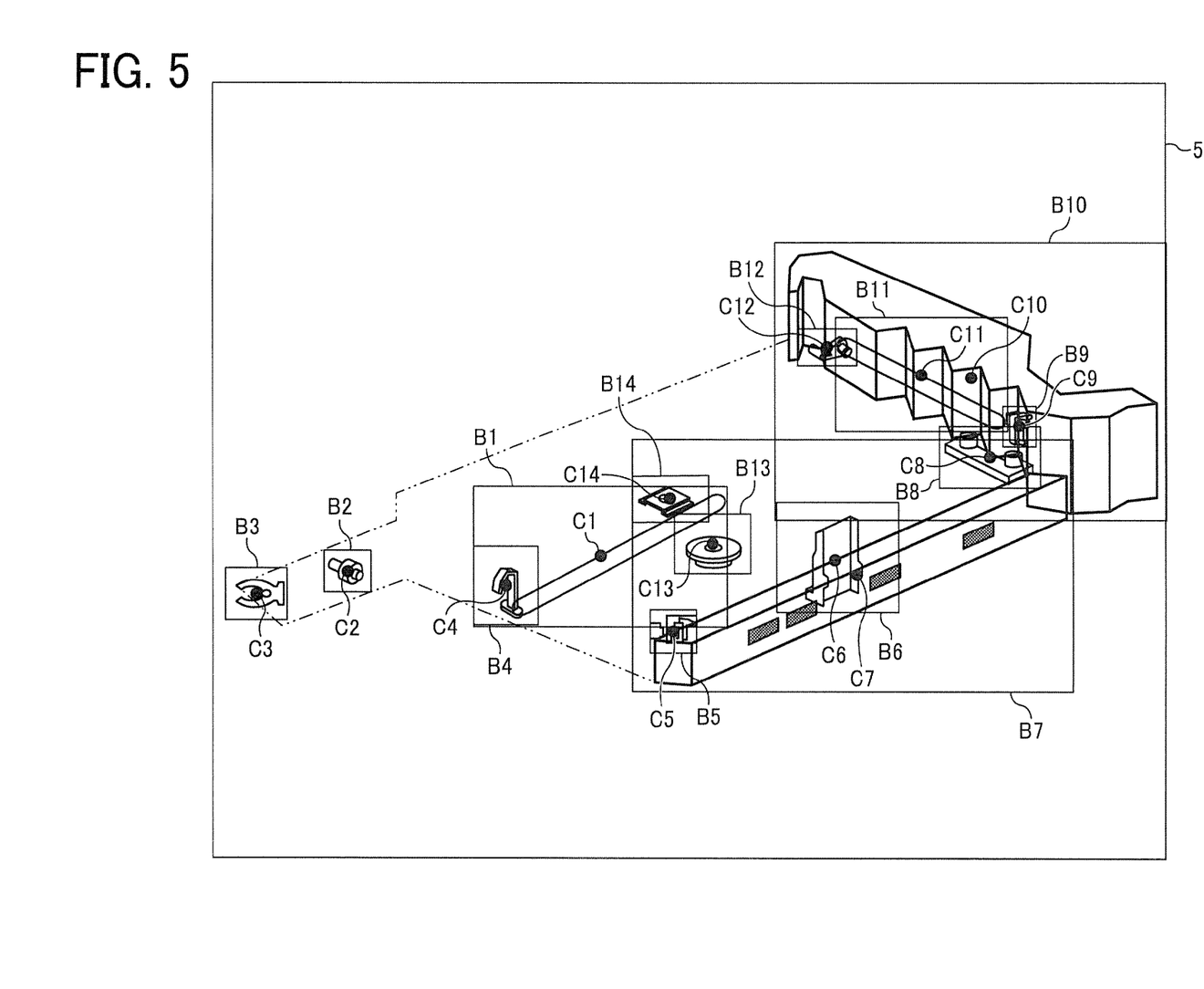
FIG. 5 illustrates a parts assembly image included in the printed image of the parts catalog shown in FIG. 4.

FIG. 5 illustrates the parts assembly image on the screen 50. Each part of the product model indicated by a solid line is highlighted and surrounded by rectangular frames B1 to B14 as boundary information.

According to this illustrative embodiment, as illustrated in FIG. 5, when the parts assembly image generated by the assembly image generator 24 in step S102 includes 14 highlighted parts surrounded by the rectangular frames B1 to B14, respectively, the individual image arrangement calculator 26 calculates a position of arrangement of the individual image of each part around the assembly image.

It is to be noted that the individual image arrangement calculator 26 obtains straight lines dividing the assembly image into left, right, top, and bottom areas, such that each area includes an equal number of parts. However, since each area includes a plurality of parts, leading lines are drawn from each of the highlighted parts on the assembly image to the corresponding individual images so as not to intersect.

Figure 6:
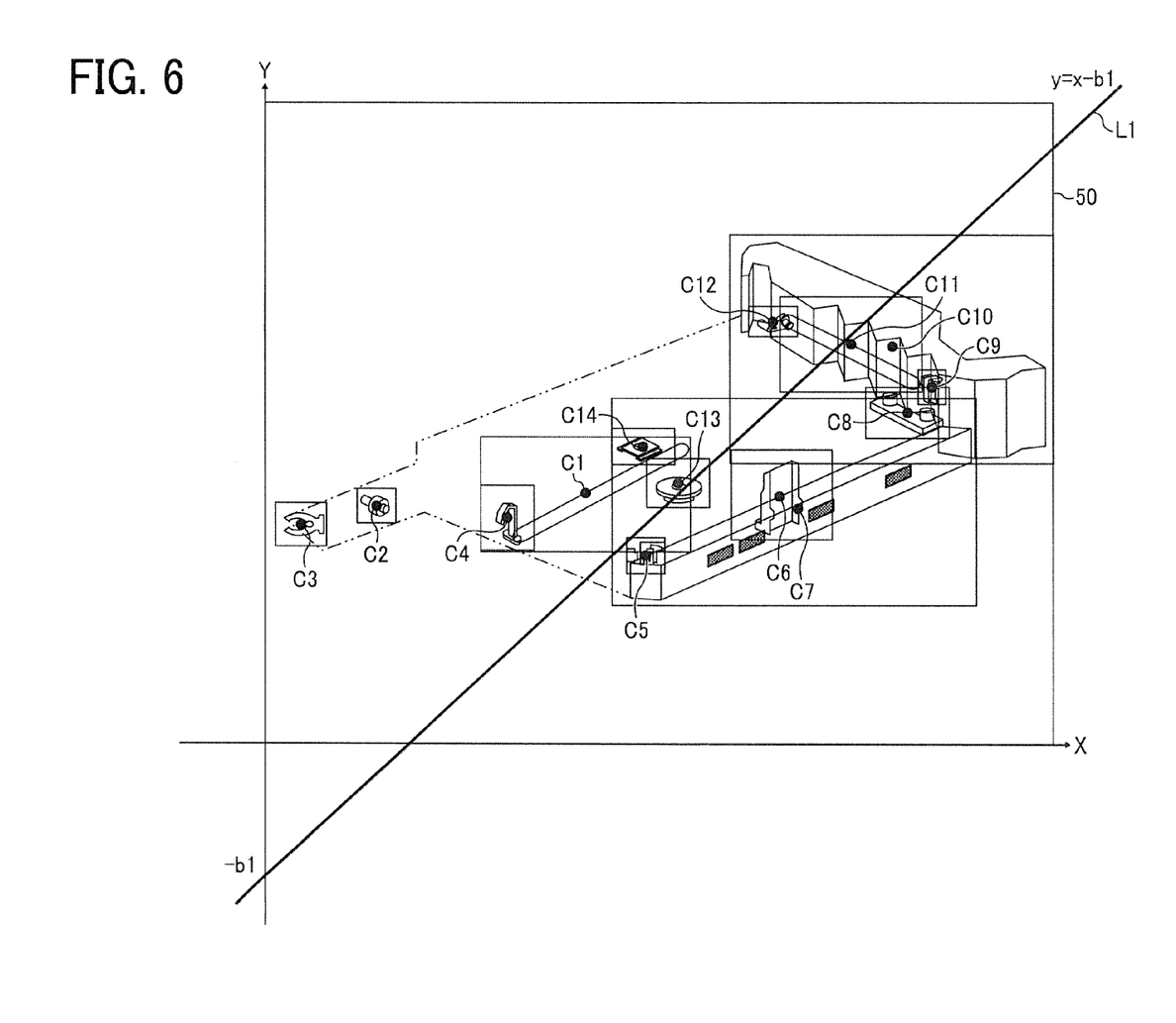
FIG. 6 illustrates a first line dividing the parts assembly image shown in FIG. 5.
Figure 7:
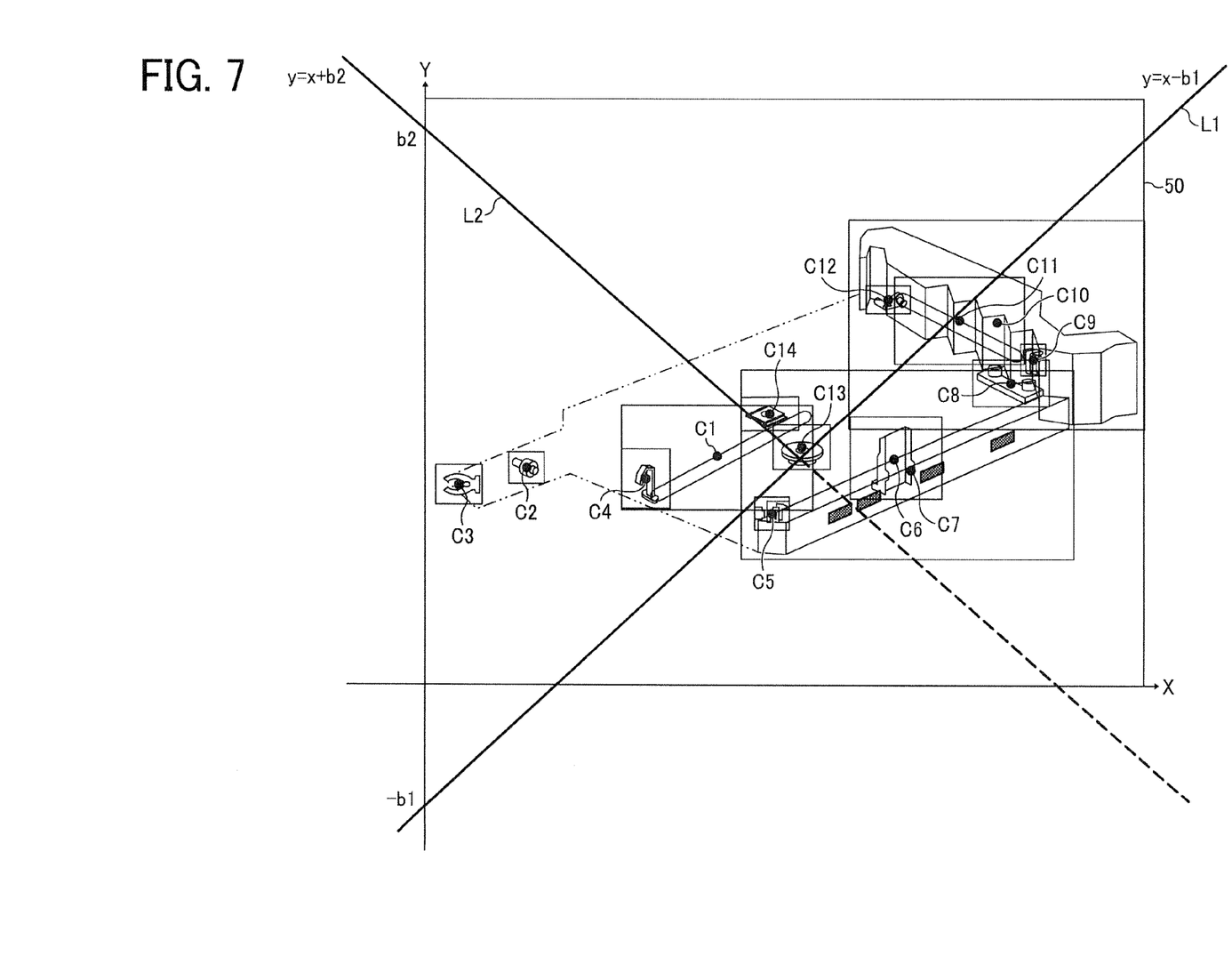
FIG. 7 illustrates a second line dividing the parts assembly image shown in FIG. 6.
Figure 8:
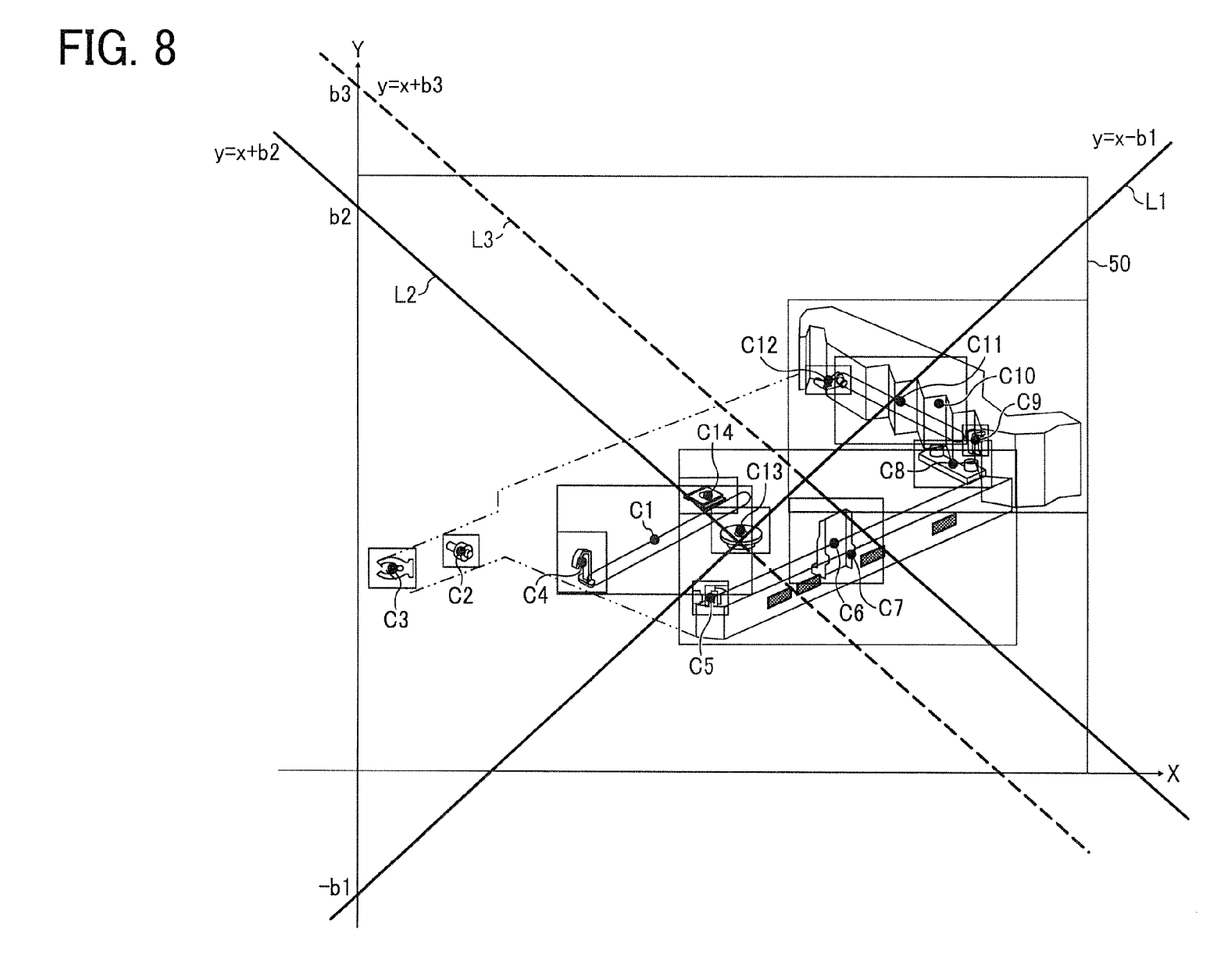
FIG. 8 illustrates a third line dividing the parts assembly image shown in FIG. 7.

FIG. 3B is a flowchart of the process performed by the individual image arrangement calculator 26 in step S104 depicted in FIG. 3A. FIG. 6 illustrates a first dividing line L1 dividing the assembly image. FIG. 7 illustrates a second dividing line L2 dividing the assembly image. FIG. 8 illustrates a third dividing line L3 dividing the assembly image.

In step S104-1, the individual image arrangement calculator 26 obtains a center position of the highlighted part on the assembly image based on the boundary information of the part calculated by the boundary information calculator 25 in step S103. Since the boundary information includes coordinate values of two points representing the rectangle surrounding the outline of the part, that is, the rectangular frames B1 to B14, the individual image arrangement calculator 26 calculates the center position of the rectangle based on the coordinate values of two points by a simple calculation. As illustrated in FIG. 5, center points C1 to C14 indicate a center of the rectangular frames B1 to B14 as a center position of each of the highlighted parts as well.

In step S104-2, as illustrated in FIG. 6, the individual image arrangement calculator 26 obtains a straight line L1 dividing the assembly image into the left upper area and the lower right area, also referred to as a dividing line, such that an equal number of the center points C1 to C14 of each of the highlighted parts obtained in the step S104-1 is included in the left upper area and the lower right area.

The dividing line L1 equally distributes the center points C1 to C14 of each part. That is, the left upper area includes a group of the center points C1, C2, C3, C4, C12, C13, and C14, while the lower right area includes a group of the center points C5, C6, C7, C8, C9, C10, and C11.

When an inclination of the dividing line L1 relative to the x, y coordinate axes is considered as "1", the dividing line L1 is represented in the x-y two-dimensional coordinate system of the assembly image by the following formula (1):

$$L1: Y=X+b \qquad (1)$$

where b represents an intercept calculated based on the coordinate values of the center points C1 to C14 of each part using a known calculation method such as convergence including a bisection algorithm. In the assembly image in FIG. 6, the intercept b=−b1, and therefore the dividing line L1 on the assembly image in FIG. 6 is represented by the following formula (2):

$$L1: Y=X-b1 \qquad (2)$$

After the individual image arrangement calculator 26 obtains the straight line L1 dividing the assembly image into the left upper area and the lower right area in step S104-2, the Individual image arrangement calculator 26 obtains a straight line L2 further dividing the assembly image to distribute an equal number of the center points C1, C2, C3, C4, C12, C13, and C14 of each part into each of the divided areas in step S104-3.

That is, the straight line L2 obtained by the individual image arrangement calculator 26 further divides the left upper area into the upper area and the left area, as illustrated in FIG. 7.

The dividing line L2 equally distributes the center points C1, C2, C3, C4, C12, C13, and C14 into the upper area and the left area, so that the upper area includes C12, C13, and C14, while the left area includes C1, C2, C3, and C4.

When an inclination of the dividing line L2 relative to the x, y coordinate axes is considered as "−1", that is, the dividing line L2 is perpendicular to the line L1, the dividing line L2 is represented in the x-y coordinate system of the assembly image by the following formula (3):

$$L2: Y=-X+b2 \qquad (3)$$

where b2 represents an intercept calculated based on a coordinate value of the center points of each part in the x-y coordinate system using a known calculation method such as convergence including a bisection algorithm.

In step S104-4, the individual image arrangement calculator 26 obtains a straight line L3 dividing the lower right area of the assembly image into right and lower areas.

As illustrated in FIG. 8, the straight line L3 divides the lower right area of the assembly image to equally distribute the center points C5, C6, C7, C8, C9, C1, and C11 into the right area and the lower area, so that the right area includes C8, C9, C10, and C11, while the left area includes C5, C6, and C7.

When an inclination of the dividing line L3 relative to the x, y coordinate axes is considered as "−1", that is, the dividing line L3 is perpendicular to the dividing line L1, the dividing line L3 is represented in the x-y coordinate system on the assembly image by the following formula (4):

$$L3: Y=-X+b3 \qquad (4)$$

where b3 represents an intercept calculated based on a coordinate value of the center points of each part in the x-y coordinate system using a known calculation method such as convergence including a bisection algorithm.

Therefore, as described in the steps S104-2, S104-3, and S104-4, the straight lines L1, L2, and L3 having an inclination of +1 or −1 in the x-y coordinate system equally divide the assembly image into upper, lower, left, and right areas to equally distribute all the parts into each of the divided areas. Thus, the divided areas are substantially equal in size and have a sector-like shape from the center of the assembly image to the edge of the screen 50 in vertical and horizontal directions (directions of x-, y-axes), respectively.

Accordingly, when the individual image of each part corresponding to the highlighted part on the assembly image is positioned inside the applicable area, a leading line drawn from the part on the assembly image to the corresponding individual image of the part does not protrude from the area, thereby preventing the leading lines from crossing, as well as improving viewability of an output image of a parts catalog.

According to this illustrative embodiment, the individual image arrangement calculator 26 depicted in FIG. 2 obtains the dividing lines L1, L2, and L3 to divide the assembly image into four areas to arrange the individual images of each part in the corresponding areas. Therefore, a storage device, for example, the memory 12 or the external storage device 15, depicted in FIG. 1, stores information on the arrangement of each part obtained by the individual image arrangement calculator 26, which is used for generation of a printed image of a parts catalog.

However, as illustrated in FIG. 5, when 14 parts included in the assembly image of the product model are equally distributed in the upper, lower, left, and right areas, since each area includes a plurality of parts, leading lines from each part included in the same area may intersect.

Therefore, in order to prevent crossing of the leading lines drawn from each part included in the same area, the individual image arrangement calculator 26 compares coordinate values of a center point of each part included in the same area to define arrangement of the part. According to this illustrative embodiment, when the assembly image is divided into the upper, lower, left, and right areas, as illustrated in FIG. 8, the individual image arrangement calculator 26 defines a position of the individual image by arranging the individual image in the order of the x- or y-coordinate values of the center point of each part on the assembly image, thereby preventing crossing of the leading lines.

As illustrated in FIG. 3B, after the individual image arrangement calculator 26 divides the assembly image into the upper, lower, left, and right areas to equally distribute all the parts in steps S104-1, S104-2, S104-3, and S104-4, the individual image arrangement calculator 26 compares coordinate values of the center point of each part included in the same area to define the order of arrangement of the individual image in the divided area in step S104-5. It is to be noted that the coordinate value of the center point of each part to be compared corresponds to the x- and y-coordinate values obtained in step S104-1.

Specifically, when the individual image arrangement calculator 26 determines the order of arrangement of the individual image of each part included in the upper and the lower areas, the individual image arrangement calculator 26 compares x-coordinate values of the center point of each part to determine the individual image to be arranged to the left of the assembly image in the order of increasing x-coordinate values. Therefore, as illustrated in FIG. 8, the center points C14, C13, and C12 are arranged to the left in the upper area of the assembly image, and the center points C5, C6, and C7 are arranged to the left in the lower area of the assembly image thereof.

When the individual image arrangement calculator 26 determines the order of arrangement of the individual image of each part included in the left and the right areas, the individual image arrangement calculator 26 compares y-coordinate values of the center point of each part to determine the individual image to be arranged from the top of the assembly image in the order of decreasing y coordinate values. Therefore, the center points C1, C2, C3, and C4 are arranged from the top in the left area of the assembly image, and C11, C10, C9, and C8 are arranged from the top in the right area thereof.

Thereafter, the individual image arrangement calculator 26 provides the print data generator 27 depicted in FIG. 2 with information on the center position of each part, information on which area each part belongs to on the assembly image, and information on an arrangement of each part in each area.

Referring back to FIG. 3A, after the individual image arrangement calculator 26 calculates the position of arrangement of the individual image of each part in step S104, the print data generator 27 receives a result obtained from the previous processes in steps S101 through S104 and generates a printed image of a parts catalog in step S105.

To be specific, the print data generator 27 receives the parts assembly image with a specific part highlighted from the assembly image generator 24 and receives the individual image of the highlighted part from the individual image generator 23. The print data generator 27 then arranges the individual image around the parts assembly image according to the conditions for determining the position of arrangement of the individual image received from the individual image arrangement calculator 26. Thereafter, the print data generator 27 draws a leading line connecting the highlighted part on the assembly image with the individual image arranged around the assembly image according to the above conditions.

More specifically, as the conditions for determining the position of arrangement of the individual image, the individual image arrangement calculator 26 defines the information of which area each part belongs to on the assembly image and the information on the order of arrangement of each part in each area. Therefore, based on the above information, the print data generator 27 positions the individual image of each part.

Thereafter, the print data generator 27, serving as an output image generator, generates an image of a parts catalog in which a leading line connects the individual image of each part to the center position of the corresponding part on the assembly image.

As a result, as illustrated in FIG. 4, the image processing apparatus 100, serving as a parts catalog printed image creation system, generates a printed image of the parts catalog.

In the printed image of the parts catalog, the screen 50 displays each part highlighted, indicated by a solid line, on the parts assembly image, indicated by a dotted line, while a screen 50' displays individual images P1 to P14 corresponding to each of the highlighted parts positioned around the parts assembly image.

The individual images P1 to P14 are arranged in the upper, lower, left, and right areas to which each part belongs, respectively, as described above by referring to FIGS. 6, 7, and 8, that is, on the upper, lower, left, and right side of the screen 50', respectively. For example, the individual images P1, P2, P3, and P4 are positioned on the left side of the screen 50'.

The individual image of each of the plurality of parts provided in the same area is arranged in the order of increasing or decreasing coordinate values of the center position of each part. For example, the individual images P14, P13, and P12 included in the upper area are arranged to the left in the order of increasing x-coordinate values.

According to this illustrative embodiment, the image processing apparatus 100 depicted in FIG. 1, serving as a parts catalog printed image creation system, generates the printed image of the parts catalog in which the individual image of each part of the product model is arranged around the parts assembly image of the product model using the above-described method. As a result, compared to arranging the individual image at random, the leading lines drawn from the individual image of each part to the corresponding part image of the assembly image do not intersect, thereby improving viewability of the printed image of the parts catalog. Therefore, the image processing apparatus 100 can properly and efficiently provide the user with information on the structure and the like of the product.

This invention may be conveniently implemented using a conventional general-purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

As can be appreciated by those skilled in the art, although the present invention has been described above with reference to specific illustrative embodiments the present invention is not limited to the specific embodiments described above, and various modifications and enhancements are possible without departing from the scope of the invention. It is therefore to be understood that the present invention may be practiced otherwise than as specifically described herein. For example, elements and/or features of different illustrative embodiments may be combined with each other and/or substituted for each other within the scope of the present invention.

What is claimed is:

1. An image processing apparatus for generating a two-dimensional output image based on three-dimensional data of a product model assembled from its parts, comprising:
   a computer system, the computer system comprising:
      an individual image generator to generate an individual image of each part based on the three-dimensional data;
      an assembly image generator to generate a parts assembly image of the entire product model with a specific part highlighted;
      a boundary information calculator to calculate boundary information for each part highlighted on the assembly image;
      an individual image arrangement calculator to obtain a center position of the highlighted part on the parts assembly image based on the boundary information, obtain a straight line dividing the parts assembly image to equally distribute the parts into respective areas defined by the straight line, and calculate a position of arrangement of the individual image of each part corresponding to the highlighted part distributed in each of the areas; and
      an output image generator to generate an output image in which the individual image of each part is arranged around the parts assembly image and a leading line extends from the individual image of each part to the corresponding part on the parts assembly image.

2. The image processing apparatus according to claim 1, wherein the individual image arrangement calculator obtains a plurality of straight lines dividing the parts assembly image to equally distribute the parts and calculates the position of arrangement of each part image distributed in each area defined by the plurality of straight lines.

3. The image processing apparatus according to claim 2, wherein the plurality of straight lines divides the parts assembly image into upper, lower, left, and right areas.

4. The image processing apparatus according to claim 3, wherein, when a plurality of parts is included in each area defined by the straight line, the individual images of each part are arranged in order of x- or y-coordinate values of a center position of each part within an x-y coordinate system superimposed on the assembly image.

5. An image processing method for generating a two-dimensional output image based on three-dimensional data of a product model assembled from its parts, the image processing method comprising:
  operating a computer system such that it performs the acts of:
    generating an individual image of each part based on the three-dimensional data;
    generating a parts assembly image of the entire product model with a specific part highlighted;
    calculating boundary information for each part highlighted on the parts assembly image;
    obtaining a center position of the highlighted part on the assembly image based on the boundary information;
    obtaining a straight line dividing the parts assembly image to equally distribute the parts into respective areas defined by the straight line;
    calculating a position of arrangement of the individual image of each part corresponding to the highlighted part distributed in each of the areas; and
    generating an output image in which the individual image of each part is arranged around the parts assembly image and a leading line extends from the individual image of each part to the corresponding part on the parts assembly image.

6. The image processing method according to claim 5, wherein a plurality of straight lines divides the parts assembly image to equally distribute the parts, and the position of arrangement of each part image distributed in each area defined by the plurality of straight lines is calculated.

7. The image processing method according to claim 5, wherein the plurality of straight lines divides the parts assembly image into upper, lower, left, and right areas.

8. The image processing method according to claim 6, wherein, when a plurality of parts is included in each area defined by the straight line, the individual images of each part are arranged in order of x- or y-coordinate values of a center position of each part within an x-y coordinate system superimposed on the assembly image.

9. A non-transitory computer-readable storage medium having recorded thereon computer-readable program code for causing a computer system to execute an image processing method when the program code is executed on the computer system,
  the image processing method comprising:
    generating an individual image of each part of a product model based on three-dimensional data;
    generating a parts assembly image of the entire product model with a specific part highlighted;
    calculating boundary information for each part highlighted on the parts assembly image;
    obtaining a center position of the highlighted part on the assembly image based on the boundary information;
    obtaining a straight line dividing the parts assembly image to equally distribute the parts into areas defined by the straight line;
    calculating a position of arrangement of the individual image of each part corresponding to the highlighted part distributed in the divided area; and
    generating an output image in which the individual image of each part is arranged around the parts assembly image and a leading line extends from the individual image of each part to the corresponding part on the parts assembly image.

* * * * *